(12) United States Patent
Venkitasubramani et al.

(10) Patent No.: US 8,130,886 B2
(45) Date of Patent: Mar. 6, 2012

(54) SAMPLES OF BANDLIMITED SIGNALS RECOVERY SYSTEM AND METHOD

(75) Inventors: Anand Venkitasubramani, Trivandrum (IN); Sudheesh A.S, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 1038 days.

(21) Appl. No.: 11/971,217

(22) Filed: Jan. 9, 2008

(65) Prior Publication Data

US 2009/0174471 A1     Jul. 9, 2009

(51) Int. Cl.
*H04L 7/00* (2006.01)
(52) U.S. Cl. ........ 375/355; 375/354; 375/357; 375/368; 375/370
(58) Field of Classification Search .................. 375/355, 375/354, 357, 368, 370
See application file for complete search history.

(56) References Cited

U.S. PATENT DOCUMENTS

| | | | |
|---|---|---|---|
| 5,852,630 A * | 12/1998 | Langberg et al. ............. | 375/219 |
| 6,314,129 B1 * | 11/2001 | Sunwoo et al. ............... | 375/149 |
| 6,567,480 B1 * | 5/2003 | Brardjanian et al. ......... | 375/331 |
| 7,035,215 B1 * | 4/2006 | Engdahl ........................ | 370/235 |
| 7,471,718 B2 * | 12/2008 | Yamada ........................ | 375/150 |
| 7,639,766 B2 * | 12/2009 | Wei ............................... | 375/355 |
| 2002/0181438 A1 * | 12/2002 | McGibney .................... | 370/350 |
| 2004/0029609 A1 * | 2/2004 | Li ................................ | 455/550.1 |
| 2006/0284669 A1 * | 12/2006 | Moore .......................... | 327/551 |
| 2009/0052558 A1 * | 2/2009 | Lee et al. ..................... | 375/242 |

* cited by examiner

*Primary Examiner* — Siu Lee
(74) *Attorney, Agent, or Firm* — Kenyon & Kenyon LLP (57) ABSTRACT

A method and system of sample recovery is disclosed. In one embodiment, a method includes selecting initially in an arbitrary manner, a current symbol from a sequence of input samples, comparing a symbol timing estimate associated with the current symbol to a predetermined threshold, selecting a future symbol strobe that is ahead at an interval equivalent to a predetermined interval based on the comparison of the symbol timing estimate to the predetermined threshold, selecting a future symbol from the sequence of samples corresponding to the future symbol strobe, assigning the future symbol to the current symbol, which is the recovered symbol, rearranging the recovered symbols to form Pulse Code Modulated (PCM) samples of a bandlimited signal at a sample rate which is derived from the recovered symbol rate, and resampling at the sample rate of the receptor block which receives the recovered PCM samples.

22 Claims, 11 Drawing Sheets

SAMPLES OF BANDLIMITED SIGNALS RECOVERY SYSTEM AND METHOD

FIELD OF THE INVENTION

The present invention relates generally to communication systems and more particularly relates to samples of bandlimited signals recovery system and method.

BACKGROUND

Receivers in digital communication systems may rely on signal timing recovery to detect the symbols in the input data signal. For example, a receiver may receive a modulated signal to recover message bits/symbols. After passband to baseband conversion, the receiver may then sample the baseband signal at a rate synchronous to the symbol rate for optimum detection of symbols. The sampling clock in the receiver, used to sample the input signal, may not be synchronized with the symbol clock.

Although the symbol rate may be known to the receiver, the sampling clock may not be commensurate with the symbol clock for various reasons, i.e., the sampling clock may be related to the symbol rate in a non-integer manner. For this reason, the receiver may not be able to generate an accurate symbol clock from the sampling clock.

Under these conditions, various symbol timing recovery techniques are sometimes used in receivers in which, the sampling clock is incommensurate with the symbol clock. The symbol timing recovery techniques, however, may rely on a separate symbol clock generator, which may be unacceptable in terms of area. In addition, such techniques may be limited in terms of performance due to relatively small drift in sampling clock frequency.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method and system of sample recovery is disclosed. In the following description, for purposes of explanation, numerous specific details are set forth in order to provide a thorough understanding of the various embodiments. It will be evident, however, to one skilled in the art that the various embodiments may be practiced without these specific details.

Figure 1:
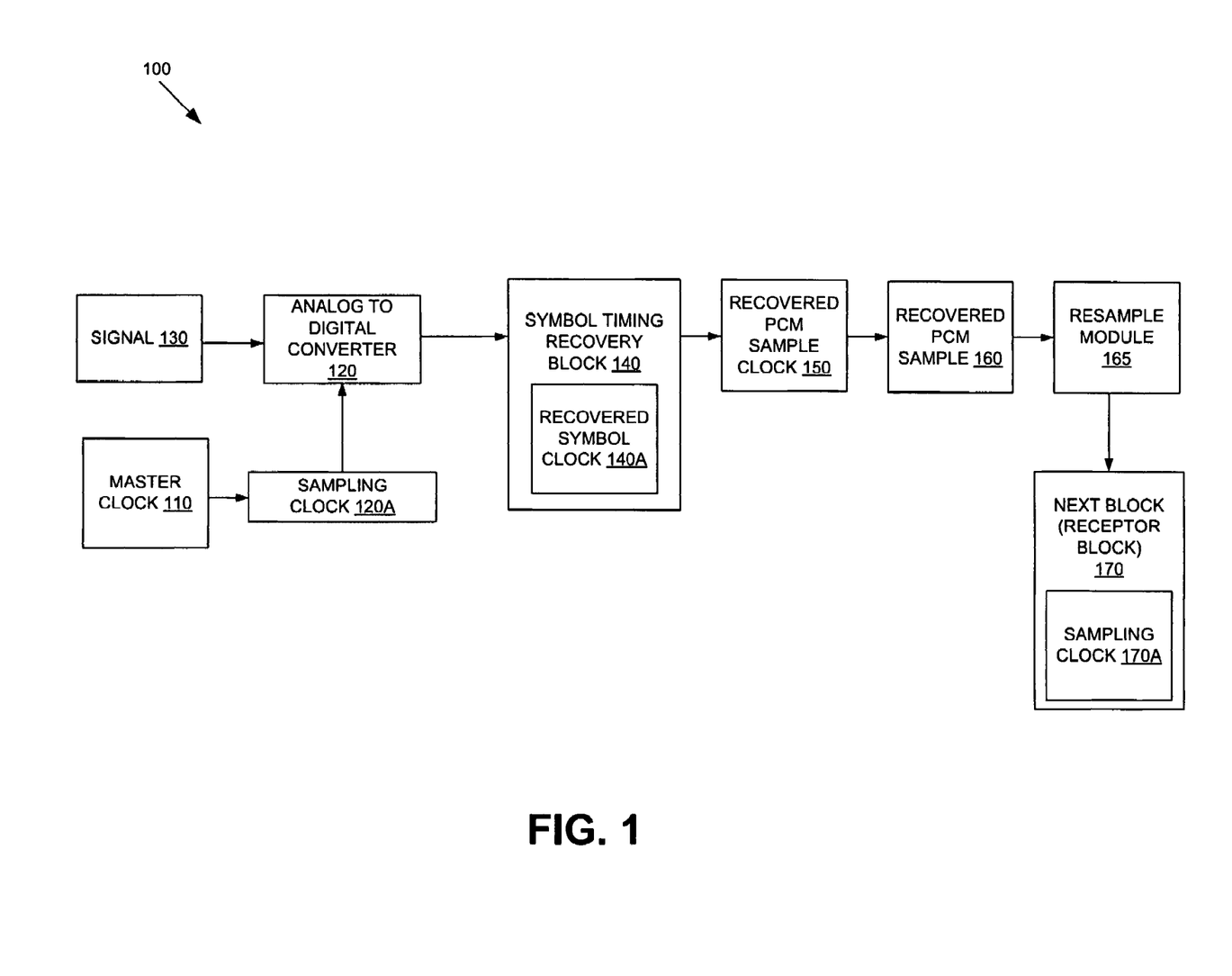
FIG. 1 is a communication system structure including a symbol timing recovery block, according to one embodiment.

FIG. 1 is a communication system structure 100 including a symbol timing recovery block 140, according to one embodiment. Particularly, FIG. 1 illustrates a master clock 110, an analog to digital converter (ADC) 120, a sampling clock 120A, an input signal 130, the symbol timing recovery block 140, a recovered symbol clock 140A, a recovered Pulse Code Modulated (PCM) sample clock 150, a recovered PCM sample 160, a resample module 165, a next block (receptor block) 170 and a sampling clock 170A, according to one embodiment.

In operation, the master clock 110 is configured to sample input digital baseband signals (e.g., which are pulse shaped). For example, the pulse shaped signal is obtained after mixing a modulated carrier with carrier frequency. In some embodiments, the master clock 110 is used to derive the sampling clock 120A. In these embodiments, digital implementation of the symbol recovery block 140 may necessitate sampling of the incoming pulse shaped signal. For example, an Analog to Digital Converter (ADC) is used to convert the input signal 130 to digital samples. The signal 130 may be a form of information transmission, which varies continuously.

In some embodiments, the input signal 130 is sampled using the sampling clock 120A, which is derived from the master clock 110. The sampling clock 120A may sample the signal 130 and may convert the continuous pulse shaped signal to a sequence of discrete samples.

The symbol timing recovery block 140 may perform symbol timing recovery of the sampled signal received from the ADC 120. In these embodiments, the symbol timing recovery is performed by extracting the recovered symbol clock 140A from the sampling clock 120A.

For example, when the sampling clock 120A in the ADC 120 is not synchronized with a symbol rate of the incoming signal 130, it may be critical that the symbol timing recovery be performed without having resort to another clock that is synchronized to the symbol rate. In one example embodiment, sampling frequency of the digital baseband signal at the ADC 120 may not be perfectly synchronized to the symbol rate due to the non integer relationship between the symbol rate and the sampling clock 120A; and frequency drift in the master clock 110 and the sampling clock 120A in the ADC 120.

Figure 2:
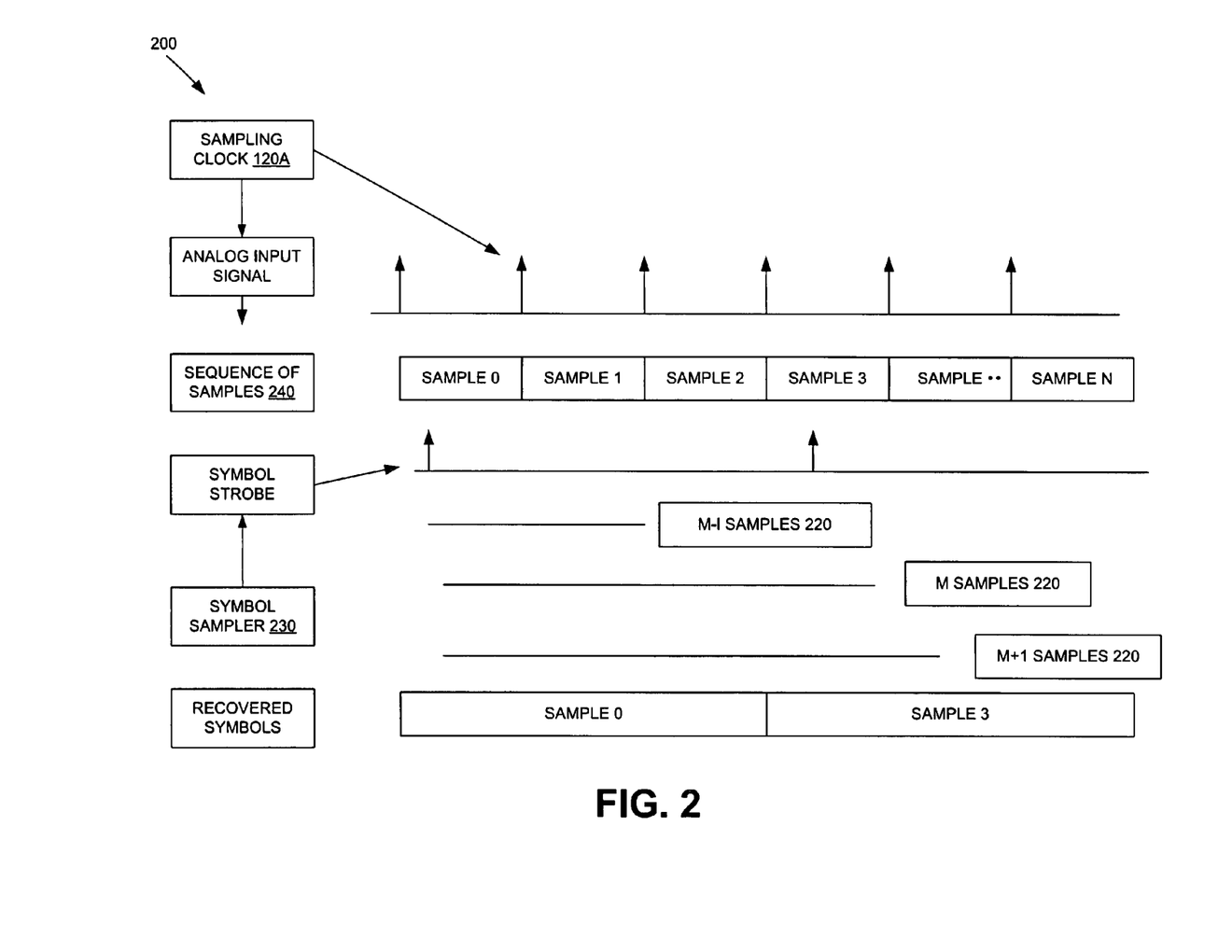
FIG. 2 is an exemplary view illustrating time intervals corresponding to a sequence of sampled input, according to one embodiment.

In various aspects, number of samples of the converter output per symbol period may not be an integer number, denying the symbol sampler (i.e., the sampler 230 as illustrated in FIG. 2) the liberty to move at a constant number of samples between symbols. Hence, the strobes produced by the symbol timing recovery block 140 are used to recover the symbols.

The recovered symbols may be assembled together according to some rule/protocol to reproduce digital PCM samples of a bandlimited signal, at a PCM sampling rate that is derived from the recovered symbol clock 140A. Further, if the recovered PCM samples 160 are sampled by the sampling clock 170A that is asynchronous with the recovered PCM sample rate, then the recovery may be complete only if the recovered PCM samples 160 are resampled at the sampling rate 170A. In these embodiments, the recovered PCM samples 160 at the recovered sample rate 160A are resampled at sample rate of the next block (receptor block) 170.

Further, there may be a mismatch between the recovered PCM sample clock 150 and the sampling clock 170A of the next block 170 due to frequency drift (e.g., crystal tolerance issues) or timing error in the symbol recovery process. This may lead to omission or repetition of the recovered PCM samples 160 when sampled by the receptor block 170. In can be noted that, the problem may be solved by resampling the recovered PCM samples from the recovered PCM sample clock 150 with the sampling clock 170A of the receptor block 170.

FIG. 2 is an exemplary view 200 illustrating time intervals corresponding to a sequence of sampled input, according to one embodiment. Particularly, FIG. 2 illustrates the sampling clock 120A, that samples the incoming data signal 130. Also, FIG. 2 illustrates symbol strobes 210, number of samples 220 (e.g., m−1, m, m+1) in the sequence of samples 240 and a symbol sampler 230.

In the example embodiment illustrated in FIG. 2, the symbol sampler 230 moves only integer number of samples 220 (e.g., m−1, m, m+1, where m is an integer). Thus, symbol strobing is done in such a way that average over r symbols may converge to p+q/r samples per symbol, where p+q/r is the ratio of the sampling clock frequency to the symbol rate, and p, q and r are integers, r≠0. In these embodiments, sampling may be done by moving the symbol sampler 230 at every symbol strobe 210 with m=p+floor (s), where s=Σq/r with the condition that the sum (s) is subtracted by 1, whenever it exceeds 1, where p, q, and r are positive integers. The recovered symbol is the value of the input sample 240 at the symbol strobe 210.

In other words, the symbol sampler 230 moves forward at every symbol strobe 210 by a number of sampling clocks that is equal to the sum of p and the floored value of the sum of the fractional part q/r, with the condition that the sum (s) is subtracted by 1, whenever it exceeds 1. In some embodiments, if the recovered symbol timing is deemed to be correct (i.e., on-time), then the symbol sampler 230 moves forward by m sampling clocks. Further, if the symbol timing is deemed early or late for the current sample, the symbol sampler 230 adjusts itself by sampling one sample late or early with respect to m, during the next symbol, respectively, (i.e. the symbol sampler 230 moves by m+1 or m−1 samples).

In one embodiment, the future symbol strobe 210 is selected with respect to m, m−1, or m+1 number of samples, based on whether the symbol timing is deemed on-time (e.g., correct), early, or late, respectively. In these embodiments, the first interval is equal to m number of samples 220 in the sequence of samples 240, the second interval is equal to (m−1) number of samples 220 in the sequence of samples 240, and the third interval is equal to (m+1) number of samples 220 in the sequence of samples 240.

Figure 3:
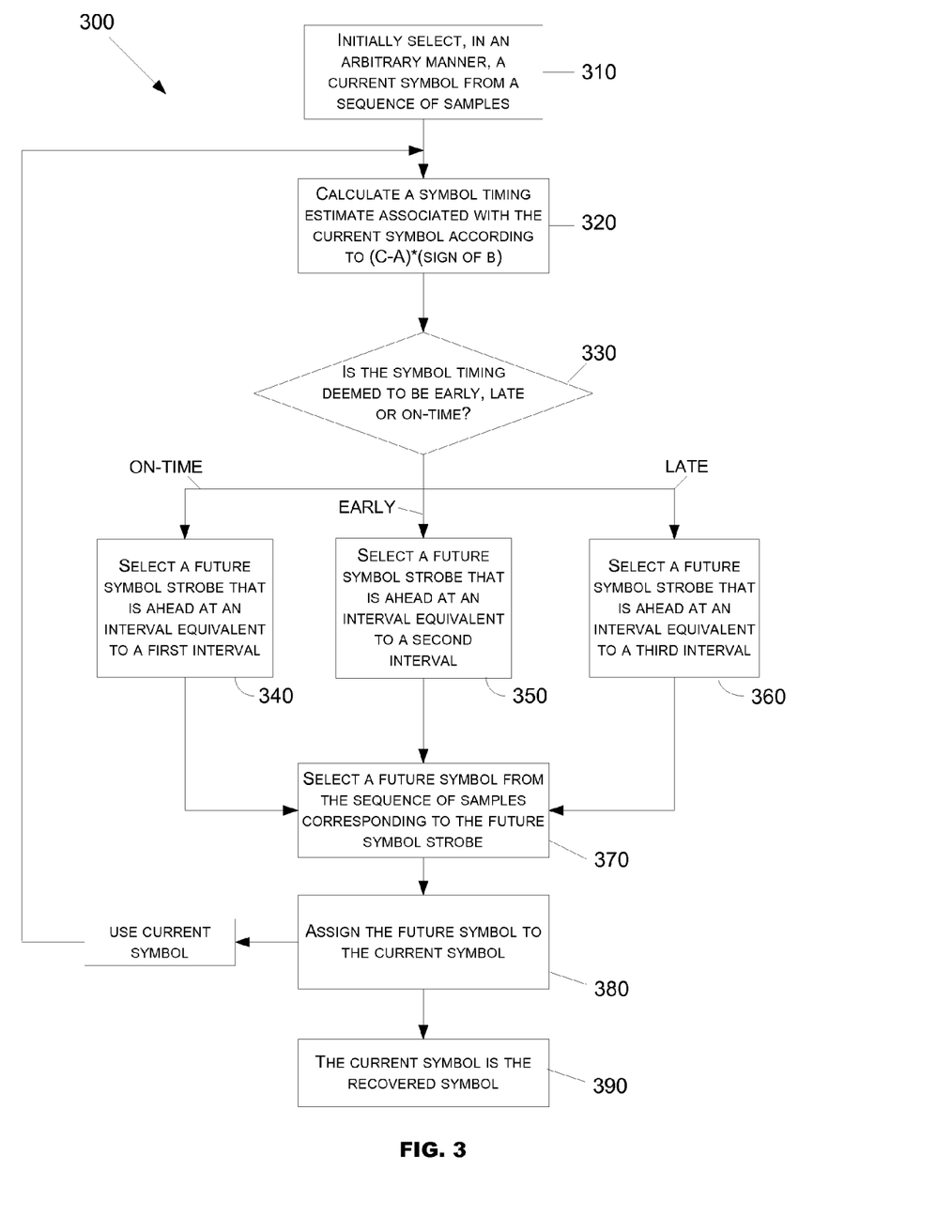
FIG. 3 is a process flow illustrating a symbol recovery method, according to one embodiment.

FIG. 3 is a process flow 300 illustrating a symbol recovery method, according to one embodiment. In operation 310, a current symbol is initially selected, in an arbitrary manner, from a sequence of input samples (e.g., the sequence of samples 240 illustrated in FIG. 2). In operation 320, a symbol timing estimate associated with the current symbol is calculated according to (C−A)*(sign of B), where B represents an amplitude of the current symbol, A refers to an amplitude of the previous input sample, and C refers to an amplitude of the future input sample.

In operation 330, the process flow 300 determines whether the symbol timing is deemed on-time, early, or late for the current symbol by comparing the symbol timing estimate with a predetermined threshold. In some embodiments, the predetermined threshold is a calibrated estimated value associated with a power level of an incoming signal 130. Further, the predetermined threshold is an estimated value associated with a direct current level of an absolute value of derivative of an input to a symbol timing recovery block 140 and scaled by a predetermined constant.

In operation 340, a future symbol strobe that is ahead at an interval equivalent to a first interval (m) is selected, if the symbol timing is deemed on-time. In these embodiments, the symbol timing is deemed on-time, if |(C−A)*(sign of B)|<Δ, where Δ refers to the predetermined threshold. In some embodiments, the first interval includes m number of samples 220 in the sequence of samples 240, where m=p+floor (s), s=Σq/r with the condition that the sum (s) is subtracted by 1, whenever it exceeds 1, and p+q/r is a ratio of the sampling clock frequency to the symbol rate, and p, q and r are positive integers.

In operation 350, a future symbol strobe that is ahead at an interval equivalent to a second interval is selected, if the symbol timing is deemed early. In these embodiments, the symbol timing is deemed early, if (C−A)*(sign of B)>Δ. In some embodiments, the second interval is equal to (m−1) number of samples 220 in the sequence of samples 240.

In operation 360, a future symbol strobe that is ahead at an interval equivalent to a third interval is selected, if the symbol timing is deemed late. In these embodiments, the symbol timing is deemed late, if (C−A)*(sign of B)<−Δ. In some embodiments, the third interval is equal to (m−1) number of samples 220 in the sequence of samples 240.

In operation 370, a future symbol is selected from the sequence of samples 240. In some embodiments, the future symbol is selected corresponding to the future symbol strobe. As mentioned above, the future symbol strobe is obtained based on the determined symbol timing (e.g., on-time, early or late) for the current symbol. In operation 380, the future symbol is assigned to the current symbol. The recovered symbol is the current symbol, i.e. the recovered symbol is the value of the input sample pointed by the symbol strobe (Step 390). Further, the process flow 300 repeats operation 320 to operation 380, for the assigned current symbol.

Figure 4:
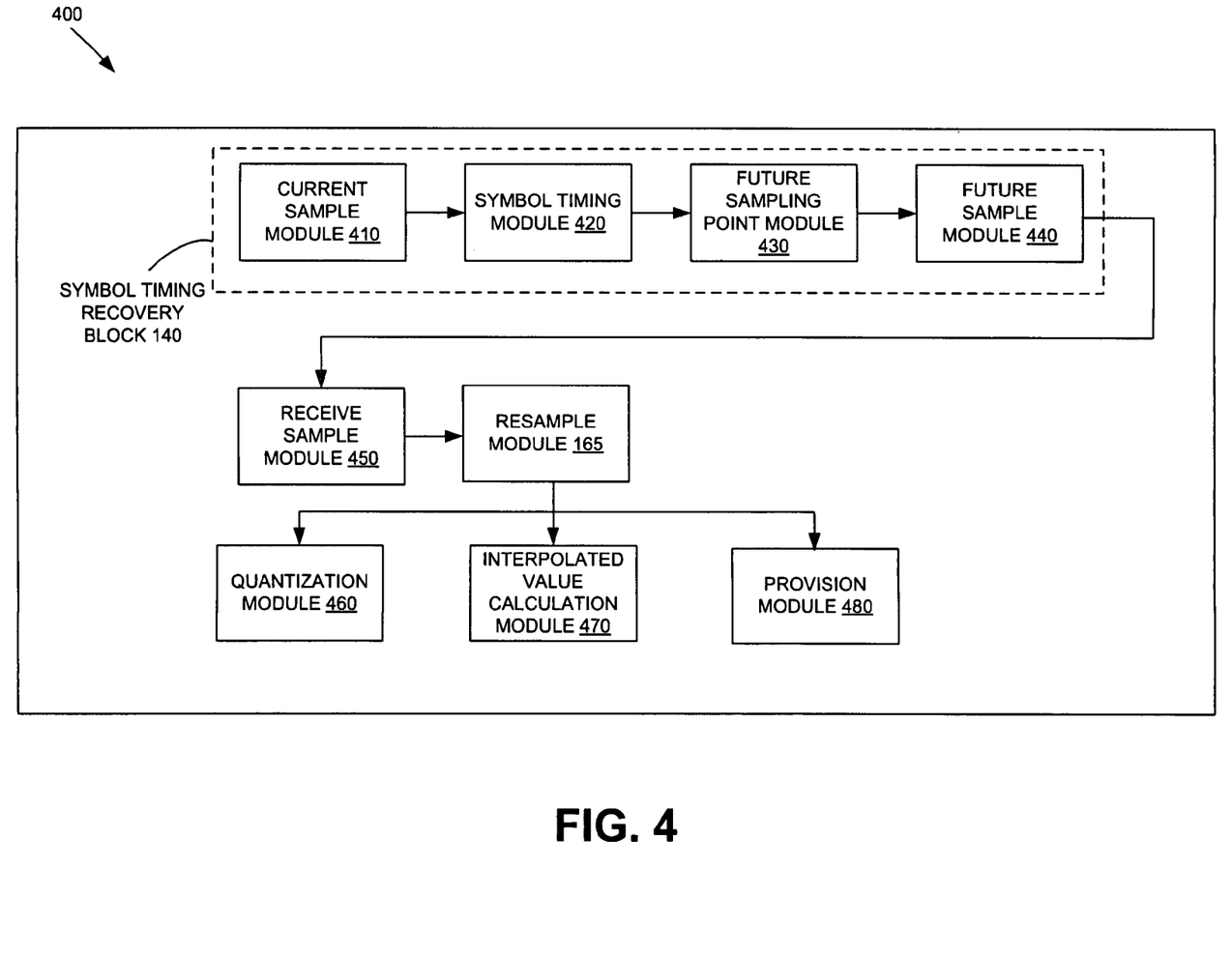
FIG. 4 is a block diagram illustrating recovery of Pulse Code Modulated (PCM) digital samples of bandlimited signals, according to one embodiment.

FIG. 4 is a block diagram 400 illustrating recovery of digital samples of bandlimited signals, according to one embodiment. Particularly, FIG. 4 illustrates a current symbol module 410, a symbol timing module 420, a future symbol strobe module 430 and a future symbol module 440 to perform symbol timing recovery for digital samples of bandlimited signals.

Also, FIG. 4 illustrates a receive sample module 450 and the resample module 165 including a quantization module 460, an interpolated value calculation module 470 and a provision module 480 to perform resampling of the recovered PCM samples 160 between different clock domains. In one embodiment, the PCM sample recovery method combines a symbol timing recovery technique and a resampling technique to recreate equivalent digital data associated with the transmitted PCM data.

In the symbol recovery operation, the current symbol module 410 is configured to initially select, in an arbitrary manner, a current symbol from a sequence of input samples associated with an input sample rate. The symbol timing module 420 is configured to compare the symbol timing estimate associated with the current symbol to the predetermined threshold ($\Delta$).

As illustrated in FIG. 3, the symbol timing estimate is calculated based on product of sign of current symbol and difference between the amplitude of the future input sample and the previous input sample, i.e., (C−A)*(sign of B). In some embodiments, the predetermined threshold comprises a calibrated estimated value associated with a power level of an incoming signal.

The future symbol strobe module 430 selects a future symbol strobe that is ahead at an interval equivalent to the first interval, if the symbol timing for the current symbol is deemed on-time, or a future symbol strobe that is ahead at an interval equivalent to the second interval if the symbol timing for the current symbol is deemed early, or a future symbol strobe that is ahead at an interval equivalent to the third interval if the symbol timing for the current symbol is deemed late.

As described earlier, the first interval includes m number of samples 220, the second interval is equal to (m−1) number of samples 220 and the third interval is equal to (m+1) number of samples 220 in the sequence of samples 240. The value of m is calculated using m=p+floor (s), where s=$\Sigma$q/r with the condition that the sum (s) is subtracted by 1, whenever it exceeds 1, and p+q/r is the ratio of the sampling clock frequency to the symbol rate, and p, q and r are positive integers. The future symbol module 440 is configured to select the future symbol from the sequence of samples 240 corresponding to the future symbol strobe. In some embodiments, the recovered symbol is the current symbol, i.e. the recovered symbol is the value of the input sample pointed by the symbol strobe. The future symbol module 440 also assigns the future symbol to the current symbol.

For example, consider the sampling frequency of the digital baseband at the converter to be Fr and the frequency of the symbol to be Fsym. Let the frequencies Fr and Fsym be related by Fr/Fsym=p+q/r, where p, q and r are positive integers. In some embodiments, matched filtering is performed with a pulse shaping filter, used in the transmitter. In theory, the symbol period is equal to p+q/r input samples, which is a non integer. The symbol sampler can move only by an integer number of samples. In these embodiments, the symbol sampler 230 moves only in integer number of samples 220 (e.g., m−1, m, m+1).

Therefore, the sampling frequency of the digital baseband at the converter may not be related to the symbol rate Fsym, in an integer fashion. Thus, the problem of deriving the symbol clock 140A from the sampling clock 120A in the converter 120 is obviated by sampling in such a way that the average over r symbols converges to p+q/r samples per symbol.

As mentioned above, the symbol sampling is done by moving the symbol sampler 230 at every sampling point by m, m+1, or m−1 input samples depending on the comparison of the symbol timing estimate with the predetermined threshold, where m=p+floor (s), where s=$\Sigma$q/r with the condition that the sum (s) is subtracted by 1, whenever it exceeds 1. In these embodiments, the symbol timing module 420 compares the symbol timing estimate to a predetermined threshold. For example, the symbol timing is deemed to be on-time if |(C−A)*(sign of B)|<$\Delta$, the symbol timing is deemed to be early if (C−A)*(sign of B)>$\Delta$, and the symbol timing is deemed to be late if (C−A)*(sign of B)<−$\Delta$, where B is the amplitude of the current symbol, C is the amplitude of the future input sample, A is the amplitude of the previous input sample, and $\Delta$ is the predetermined threshold value for comparison. In these embodiments, the samples A, B and C are signed 2s complement.

In one embodiment, when the symbol timing is deemed early or late for the current symbol, the symbol sampler adjusts itself by sampling one sample late or early with respect to m, during next symbol sampling (i.e. the symbol sampler moves by m−1 or m+1 samples, respectively).

Figure 7:
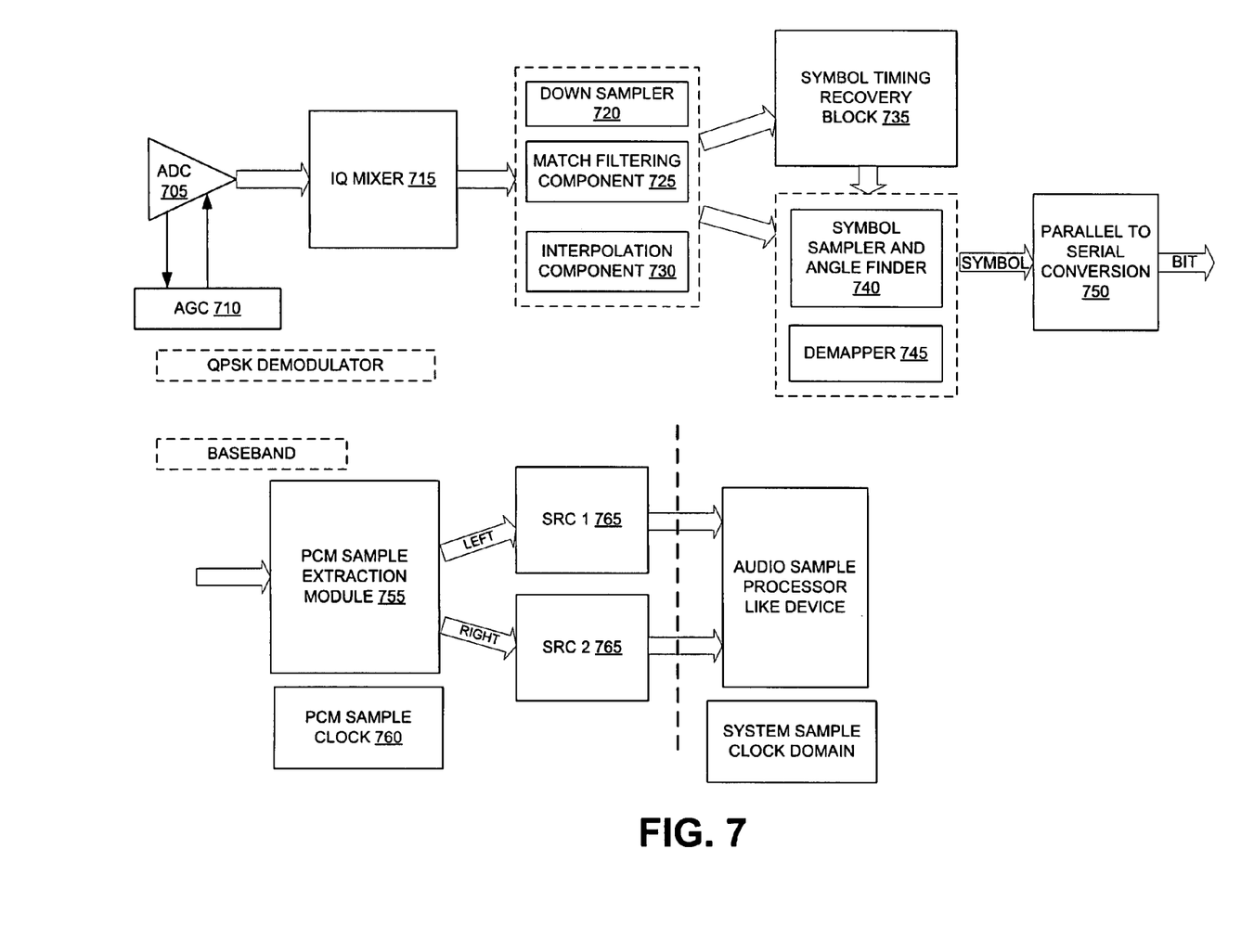
FIG. 7 exemplary block diagram illustrating sample recovery of a QPSK signal, according to one embodiment.

The varying power level of the input signal is controlled by changing the threshold dynamically proportional to the power of the input signal. In some embodiments, the threshold is set by estimating direct current value of an absolute value of derivative of the input signal 130 to the symbol timing recovery block 140. This is important in absence of an automatic gain control (AGC) 710 or when the input is a composite signal containing a signal that has a constant power and a digital carrier which can vary in power.

Further, the recovered symbols (bits) are rearranged and parallelized as per the protocol or standard to form digital PCM samples of a bandlimited signal. These recovered PCM samples 160 are at the sampling rate derived from the recovered symbol rate. If the samples are transferred to the next block 170, then the transfer can happen at the recovered sample clock 150. If the data is to be transferred to the next block 170 which samples the data with its own clock 170A, then there may be a mismatch with the recovered PCM sample clock 150 because of frequency drift and/or timing error in symbol recovery process. This may result in 'click noise' due to repeated sampling or omission. This problem is circumvented by resampling from the recovered sample clock 150 to the sampling clock 170A of the receptor block 170. In operation, this is achieved by interpolating the recovered samples to a higher rate and selecting the proper sample among them with the sampling clock 170A of the receptor block 170.

The receive sample module 450 receives the recovered symbols at the recovered symbol rate. In some embodiments, the receive sample module 450 is configured to arrange the recovered symbols to obtain digital PCM samples of a bandlimited signal. The resample module 165 resamples the recovered PCM digital samples 160. Further, the quantization module 460 is configured to quantize a sampling clock (e.g., the sampling clock 170A as illustrated in FIG. 1) associated with a receptor block (e.g., the next block 170 of FIG. 1) to a number y selected from the group including N possible instances between the two recovered samples.

In these embodiments, it is not necessary to calculate all the interpolated values in between recovered digital PCM samples 160. Therefore, the interpolated value calculation module 470 calculates an interpolated value at the selected number (i.e., y). The provision module 480 is configured to provide the interpolated value to the receptor block 170 at the sampling clock 170A of the receptor block 170. In these embodiments, the recovered samples are interpolated by a finite number N and the sampling clock 170A of the receptor block 170 is quantized to one of the N possible instants between two recovered samples. The interpolated value at that instant is calculated and given out to the receptor block 170 at the sampling clock 170A of the receptor block 170.

Figure 5:
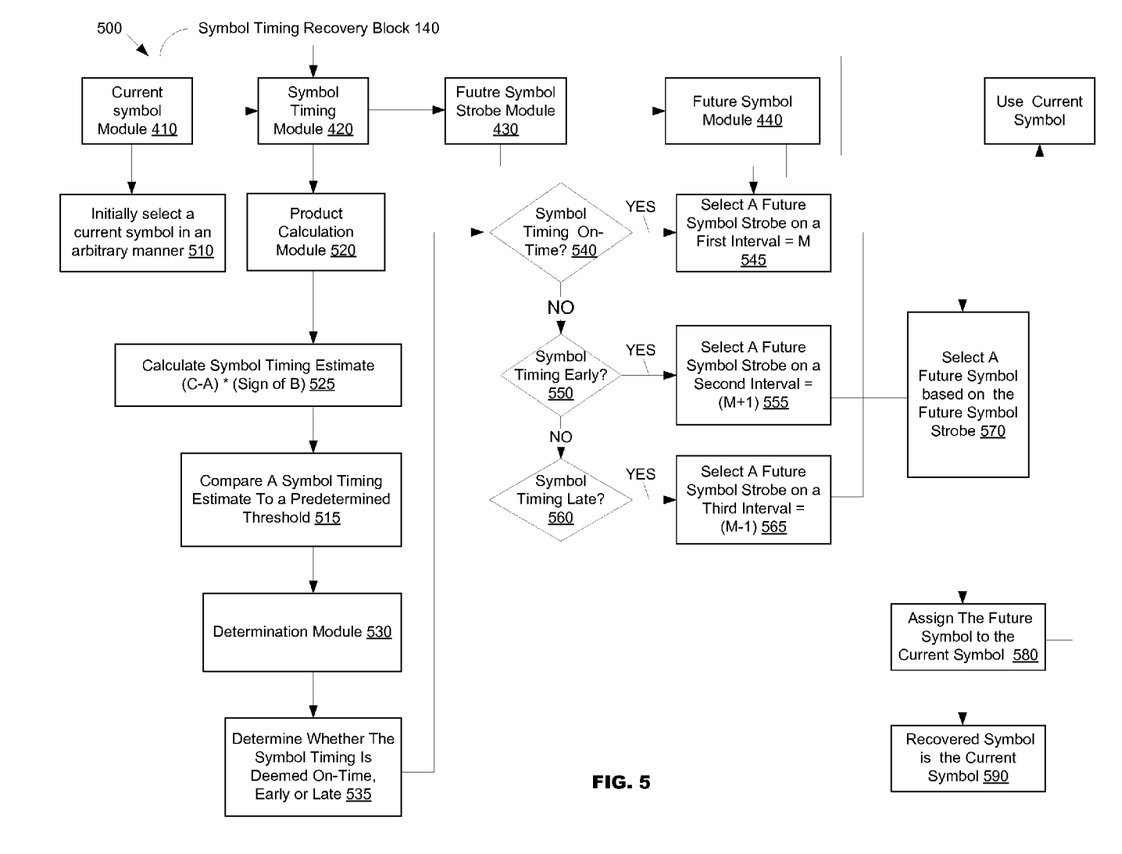
FIG. 5 an exploded view of the sample recovery system shown in detail, according to one embodiment.

FIG. 5 an exploded view 500 of the symbol recovery system shown in detail, according to one embodiment. Particularly, FIG. 5 illustrates the current symbol module 410, the symbol timing module 420, the future symbol strobe module 430, and the future symbol module 440 to perform symbol timing recovery for digital samples of bandlimited signals. In step 510, a current symbol is selected from a sequence of samples 240 in an arbitrary manner through the current symbol module 410. The symbol timing module 420 includes a product calculation module 515 which calculates a symbol timing estimate.

In step 520, the symbol timing estimate is calculated according to (C−A)*(sign of B), where B refers to an amplitude of the current symbol, A refers to an amplitude of the previous input sample, and C refers to an amplitude of the future input sample in the sequence of samples 240.

In step 525, the symbol timing estimate is compared (e.g., using the symbol timing module 420) with a predetermined threshold. In these embodiments, the product calculation module 515 includes the determination module 530 to determine whether the symbol timing is deemed on-time, early or late (e.g., as illustrated in step 535). In step 540, if the symbol timing is deemed on-time (i.e., |(C−A)*(sign of B)|<Δ), then a future symbol strobe 210 is selected based on a first interval m, in step 545. In step 550, if the symbol timing is deemed early (i.e., (C−A)*(sign of B)>Δ), then a future symbol strobe 210 is selected based on a second interval (m−1), in step 555.

In step 560, if the symbol timing is deemed late (i.e., (C−A)*(sign of B)<−Δ), then a future symbol strobe 210 is selected based on a third interval (m−1), in step 565. In these embodiments, the future symbol strobe module 430 selects the future symbol strobe 210. In step 570, a future symbol is selected from the sequence of samples 240 (e.g., through the future symbol module 440) corresponding to the future symbol strobe 210.

In step 580, the future symbol is assigned to the current symbol and the above-described steps are repeated for the assigned current symbol (e.g., as illustrated in FIG. 3). In step 590 of these embodiments, the recovered symbol is the current symbol, i.e. the recovered symbol is the value of the input sample pointed by the symbol strobe.

Figure 6:
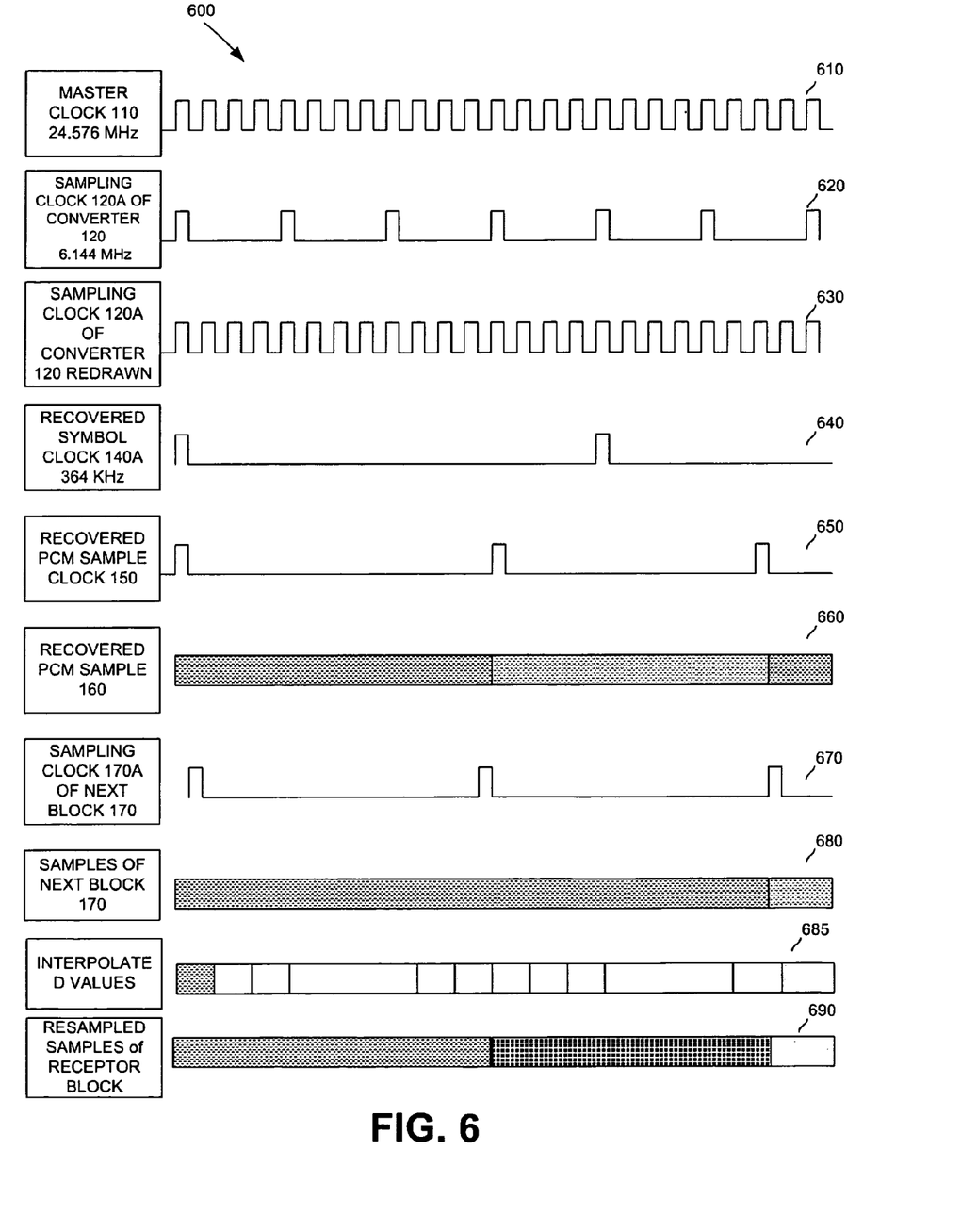
FIG. 6 is an exemplary timing diagram illustrating the PCM sample recovery process, according to one embodiment.

FIG. 6 is an exemplary timing diagram 600 illustrating the sample recovery process, according to one embodiment. The exemplary timing diagram 600 illustrates timing signals at each block explained in FIG. 1. In the timing diagram 600 illustrated in FIG. 6, the master clock 110 (Fs) may be used to derive the sampling clock 120A used to sample a pulse shaped digital signal at a frequency of 24.576 MHz. The sampling clock 120A in 610 is used in the converter 120 samples the incoming pulse shaped signal at a frequency of 6.144 MHz. In one example embodiment, the sampling frequency Fr of the ADC 120 is derived from the master clock frequency Fs.

The output signal 620 of the sampling clock 120A of the ADC 120 is redrawn in a different time scale as illustrated in 630. The symbol timing recovery block 140 recovers the symbol clock 140A which performs symbol recovery from the input samples. The recovered symbol clock 140A generates a recovered symbol 640 at a frequency of 364 KHz as illustrated.

Further, the timing signal 650 represents a sample rate of the recovered digital PCM sample clock 150. The signal 660 represents the recovered digital PCM samples 160, which are obtained by rearranging the recovered symbols according to some protocol/standard at the recovered PCM sample clock 150. As mentioned above, the recovered PCM sample 160 is transferred to the resample module 165 which resamples the recovered PCM sample 160 with the sampling clock 170A of the next block 170. As shown in the FIG. 6, the frequency of the recovered PCM sample clock 150 (e.g., timing signal 650) may not match with the frequency of the next block 170 (e.g., timing signal 670). As a result, repetition or omission of samples occurs as shown in 680.

In these embodiments, the recovered PCM samples 660 are transferred to the receptor block 170. For example, it can be envisioned that due to mismatch between the two clocks (i.e., the recovered sample clock 150 and the sampling clock 170A), the first sample gets sampled twice and the second one gets omitted. The signal 685 represents interpolated recovered samples by a finite number N, during the resampling operation. Further, the signal 690 represents the resampled recovered PCM digital samples 160 of the receptor block 170. In some embodiments, the receptor block 170 samples the digital PCM samples using the sampling clock 170A. The signal 685 and 690 illustrates resampling through interpolation and avoidance of click noise due to repetition or omission.

FIG. 7 exemplary block diagram 700 illustrating sample recovery of a QPSK signal, according to one embodiment. Particularly, FIG. 7 illustrates an analog to digital converter (ADC) 705, an automatic gain control (AGC) block 710, an IQ mixer 715, a downsampler 720, a matched filtering component 725, an interpolation component 730, a symbol timing recovery block 735, a symbol sampler and angle finder 740, a demapper 745, a parallel to serial conversion module 750, a PCM sample extraction module 755, a PCM sample clock 760 and a sample rate converter (SRC) 765.

In operation, the ADC 705 converts an analog input signal to digital samples at a sampling clock 120A. In some embodiments, the AGC block 710 ensures that input signal power as seen by a receiver is constant. Further, the IQ mixer 715 mixes the input signal to baseband into an In-Phase component and a Quadrature component.

The downsampler 720 brings down the sample rate of the digital samples and the matched filtering component 725 performs matched filtering of the digital samples for noise rejection and optimum detection after downsampling. Upon match filtering operation, the interpolation component 730 increases the sample rate to enhance detection of symbols.

The symbol timing recovery block 735 performs symbol timing. Further, the symbol sampler and angle finder 740 performs symbol recovery and determines a differential angle between successive symbols. The demapper 745 then maps the differential angle to an associated group of bits signified by the differential angle. The parallel to serial conversion module 750 serializes the symbol to bits.

The PCM sample extraction module 755 arranges the decoded bits into PCM samples of bandlimited signal according to standards/protocols. The PCM sample clock 760 generates PCM sample timing. In some embodiments, the PCM sample clock 760 is derived from the symbol clock 140A of the symbol timing recovery block 140 of FIG. 1. The SRC 765 is configured to change the sampling rate from a first sampling rate to a clock domain of a receptor block 170. In some embodiments, the PCM samples 160 are resampled to the clock domain of the receptor block 170 (e.g., like an Audio effects processor device). In these embodiments, the sampling clock 120A of the ADC 705 may be generated from the master clock 110.

Figure 8:
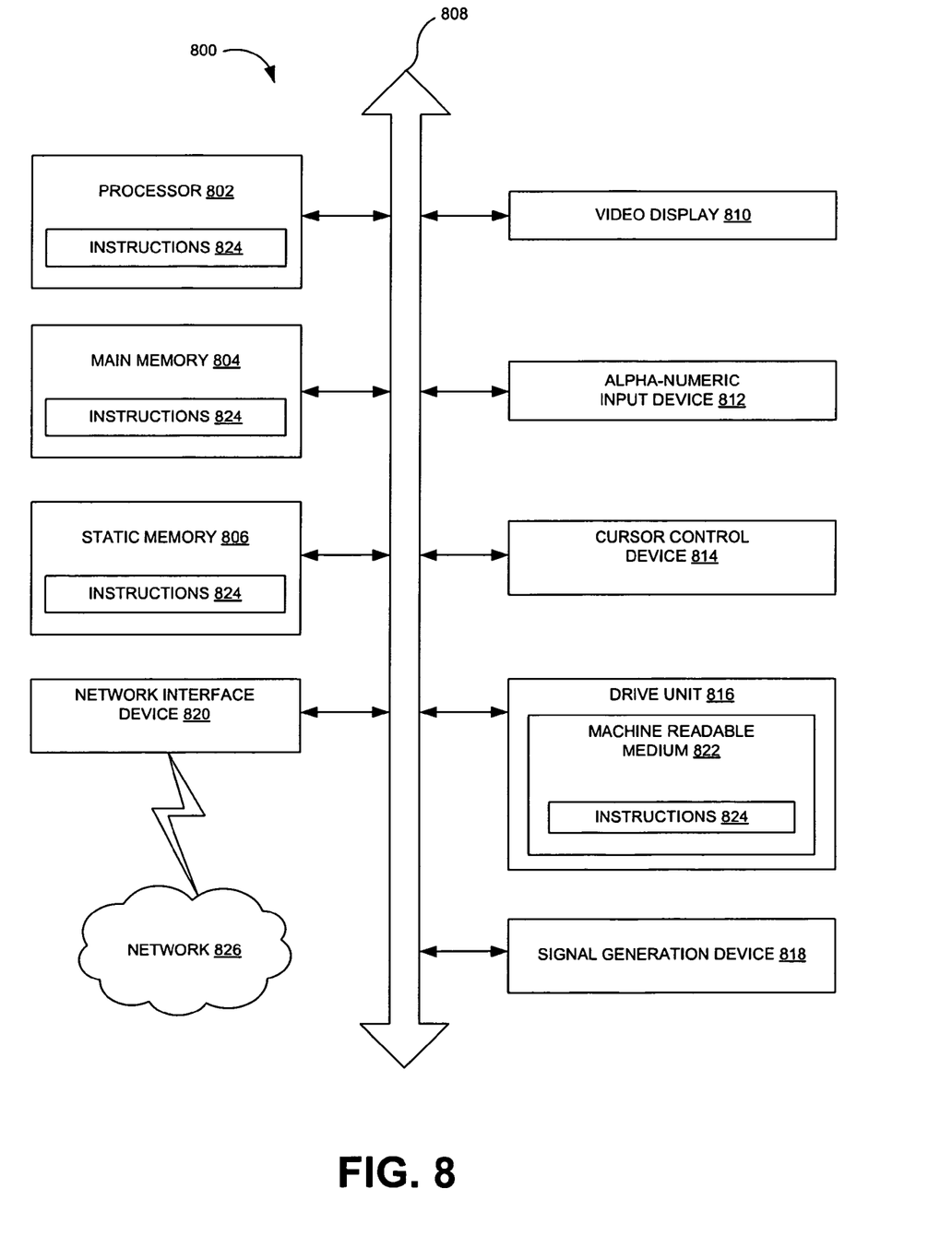
FIG. 8 is a diagrammatic system view of a data processing system in which any of the embodiments disclosed herein may be performed, according to one embodiment.

FIG. 8 is a diagrammatic system view 800 of a data processing system in which any of the embodiments disclosed herein may be performed, according to one embodiment. Particularly, the diagrammatic system view of FIG. 8 illustrates a processor 802, a main memory 804, a static memory 806, a bus 808, a video display 810, an alpha-numeric input device 812, a cursor control device 814, a drive unit 816, a signal generation device 818, a network interface device 820, a machine readable medium 822, instructions 824 and a network 826, according to one embodiment.

The diagrammatic system view 800 may indicate a personal computer and/or a data processing system in which one or more operations disclosed herein are performed. The processor 802 may be a microprocessor, a state machine, an application specific integrated circuit, a field programmable gate array, etc. The main memory 804 may be a dynamic random access memory and/or a primary memory of a computer system. The static memory 806 may be a hard drive, a flash drive, and/or other memory information associated with the data processing system.

The bus 808 may be an interconnection between various circuits and/or structures of the data processing system. The video display 810 may provide graphical representation of information on the data processing system. The alpha-numeric input device 812 may be a keypad, keyboard and/or any other input device of text (e.g., a special device to aid the physically handicapped). The cursor control device 814 may be a pointing device such as a mouse. The drive unit 816 may be a hard drive, a storage system, and/or other longer term storage subsystem.

The signal generation device 818 may be a bios and/or a functional operating system of the data processing system. The network interface device 820 may perform interface functions (e.g., code conversion, protocol conversion, and/or buffering) required for communications to and from the network 826 between a number of independent devices (e.g., of varying protocols). The machine readable medium 822 may provide instructions on which any of the methods disclosed herein may be performed. The instructions 824 may provide source code and/or data code to the processor 802 to enable any one or more operations disclosed herein.

Figure 9A:
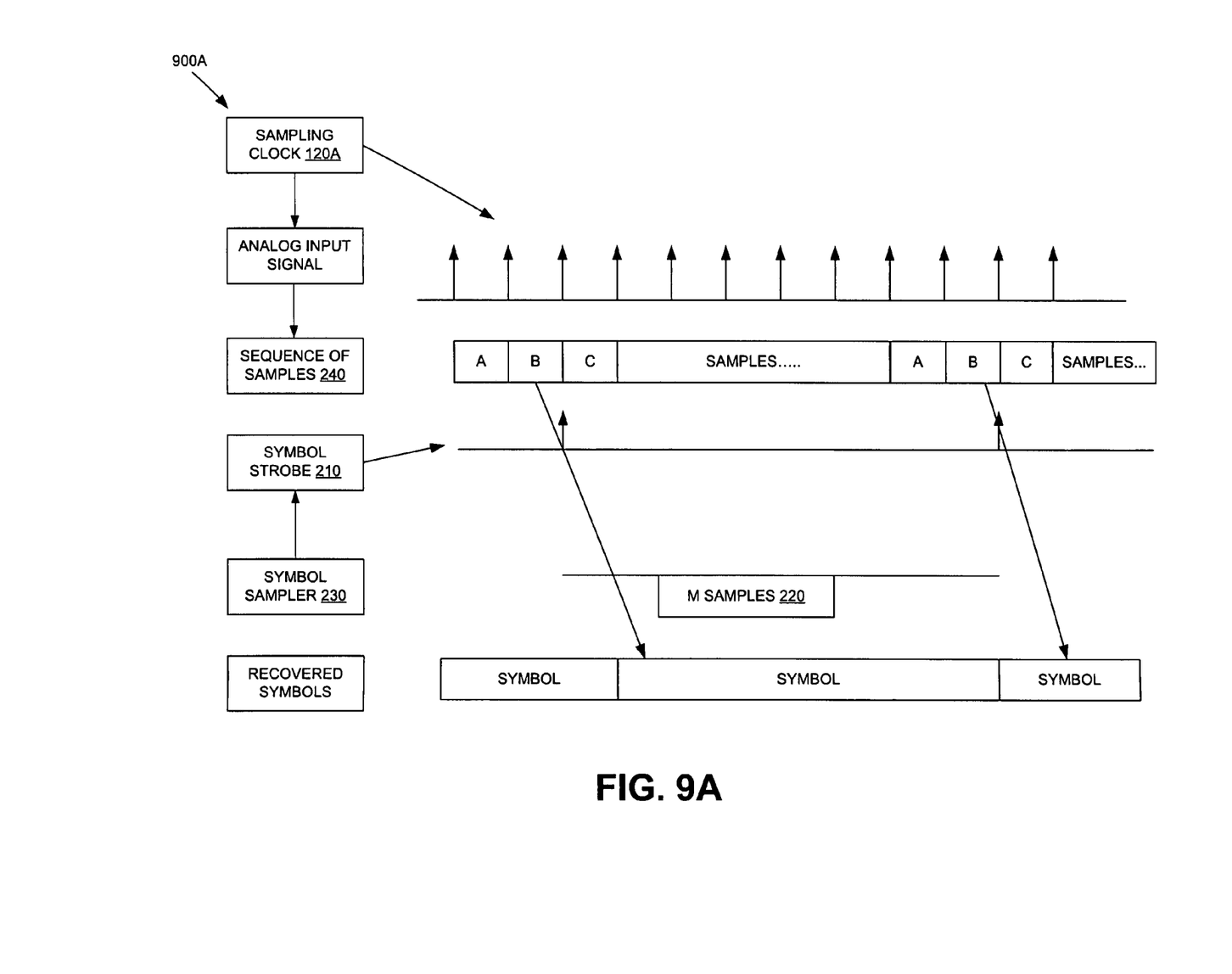
FIG. 9A is an exemplary view illustrating selection of a future sample strobe when a sample timing is deemed on-time, according to one embodiment.

FIG. 9A is an exemplary view 900A illustrating selection of a future sample strobe when a sample timing is deemed on-time, according to one embodiment. In this example, the symbol sampler 230 moves forward by m number of samples as the symbol timing is deemed on-time according to the example embodiment illustrated in FIG. 9A. In these embodiments, the future symbol strobe that is ahead at an interval equivalent to a first interval is selected when the symbol timing is deemed on-time. The first interval is equal to m number of the samples. The value of m is calculated according to: m=p+floor (s), where s=Σq/r with the condition that the sum (s) is subtracted by 1, whenever it exceeds 1 and p+q/r is the ratio of the sampling clock frequency to the symbol rate, and p, q, and r are positive integers.

Figure 9B:
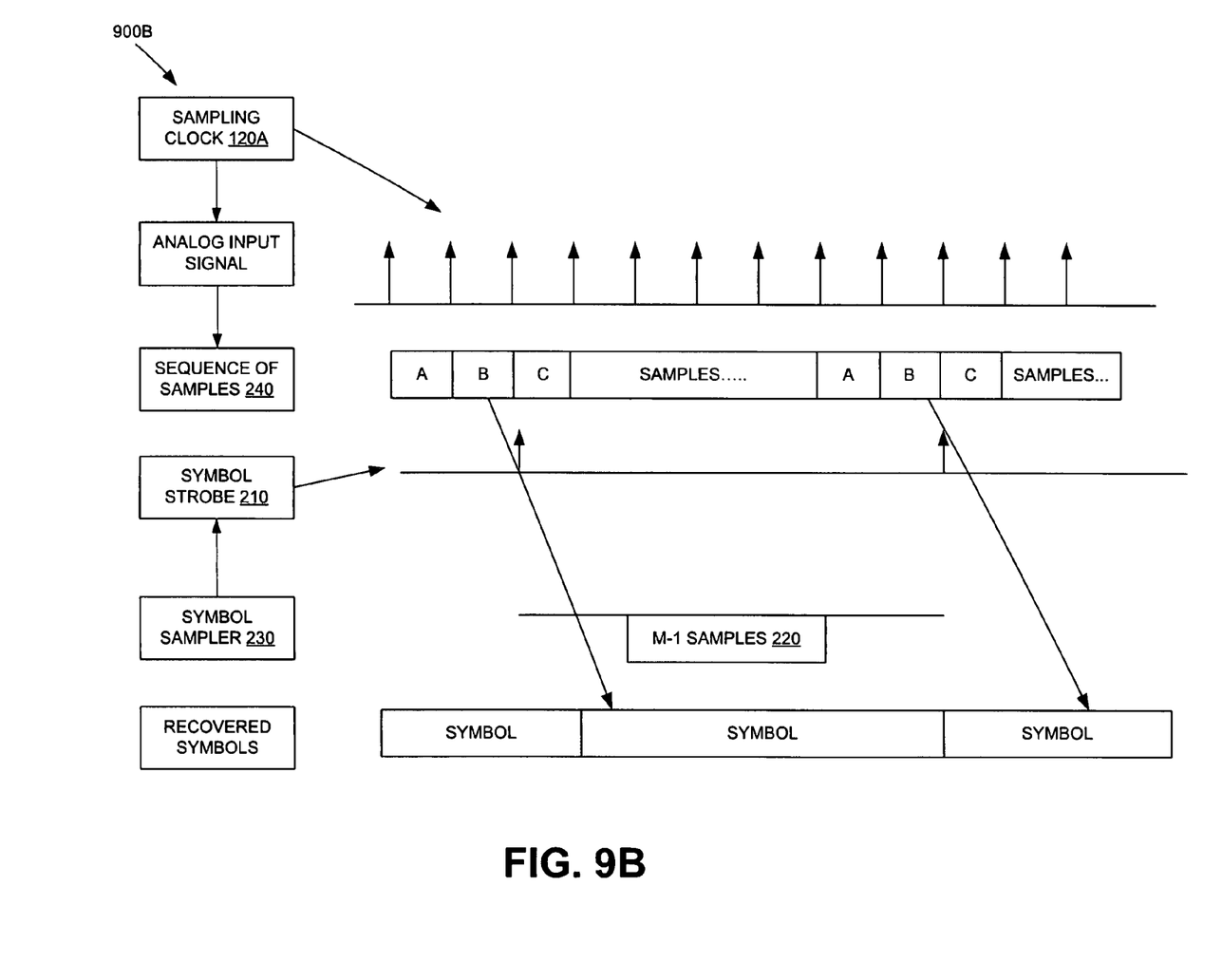
FIG. 9B is an exemplary view illustrating selection of a future sample strobe when a sample timing is deemed early, according to one embodiment.

FIG. 9B is an exemplary view 900B illustrating selection of a future sample strobe when a sample timing is deemed early, according to one embodiment. In this example, the symbol sampler 230 adjusts itself by m−1 number of samples as the symbol timing is deemed early according to the example embodiment illustrated in FIG. 9B. In these embodiments, the value of m is calculated according to: m=p+floor (s), where s=Σq/r with the condition that the sum (s) is subtracted by 1, whenever it exceeds 1, and where p, q, and r are positive integers. In these embodiments, the future symbol strobe that is ahead at an interval equivalent to a second interval is selected when the symbol timing is deemed early. The second interval is equal to m−1 number of the samples.

Figure 9C:
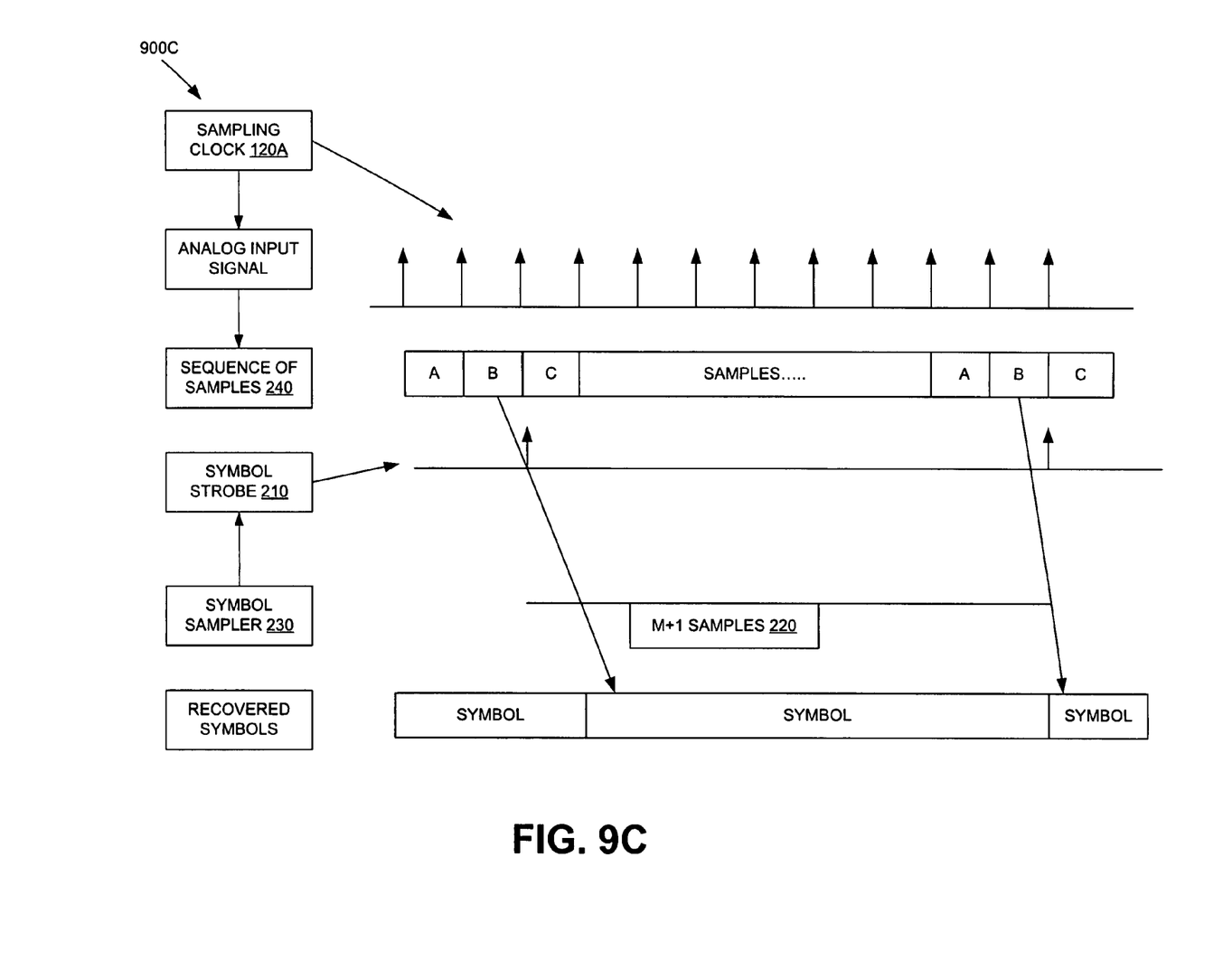
FIG. 9C is an exemplary view illustrating selection of a future sample strobe when a sample timing is deemed late, according to one embodiment.

FIG. 9C is an exemplary view 900C illustrating selection of a future sample strobe when a sample timing is deemed late, according to one embodiment. In this example, the symbol sampler 230 adjusts itself by m+1 number of samples as the symbol timing is deemed late according to the example embodiment illustrated in FIG. 9B. The value of m is calculated according to: m=p+floor (s), where s=Σq/r with the condition that the sum (s) is subtracted by 1, and where p, q, and r are positive integers. In these embodiments, the future symbol strobe that is ahead at an interval equivalent to a third interval is selected when the symbol timing is deemed late. The third interval is equal to m+1 number of the samples.

The above-described sample recovery technique works without the need for a separate symbol clock generator, thus reduces the area, size and cost. The above-described technique combines the symbol timing recovery technique and the resampling technique to recreate the equivalent of transmitted PCM data samples. Further, the above-described technique saves area and gives better performance with respect to the drift in sampling clock frequency.

The above sample recovery technique also reduces the size and cost. In addition, the above sample recovery technique is more tolerant to error in the sampling clock frequency (i.e., this technique can work with a sampling clock crystal with higher parts per million (ppm) error. In another embodiment, the above technique can be used in systems involving BPSK/QPSK demodulation.

Also, the above-described method may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a digital communication system involving pulse shaping of the transmitted digital data. Accordingly, the specification and drawings are to be regarded in an illustrative rather than a restrictive sense.

What is claimed is:
1. A method, comprising:
selecting a current symbol from the sequence of input samples;
comparing a symbol timing estimate associated with a current symbol to a predetermined threshold, wherein the symbol timing estimate comprises:

$(C-A)*(\text{sign of } B)$, wherein B=an amplitude of the current symbol, A=an amplitude of a previous input sample, and C=an amplitude of a future input sample;
selecting a future symbol strobe that is ahead at an interval equivalent to a predetermined interval based on the comparison of the symbol timing estimate to the predetermined threshold, wherein
if the symbol timing for the current symbol is deemed on-time, selecting the future symbol strobe that is ahead at an interval equivalent to a first interval;
if the symbol timing for the current symbol is deemed early, selecting the future symbol strobe that is ahead at an interval equivalent to a second interval;
if the symbol timing for the current symbol is deemed late, selecting the future symbol strobe that is ahead at an interval equivalent to a third interval;
selecting a future symbol from a sequence of samples, corresponding to the future symbol strobe; and
assigning the future symbol to the current symbol, wherein recovered symbol is the current symbol.

2. The method of claim 1, wherein the first interval comprises m number of samples in the sequence of samples, wherein: m=p+floor (s), wherein: s=Σq/r with the condition that the sum (s) is subtracted by 1, whenever it exceeds 1, and wherein p+q/r is a ratio of a sampling clock frequency to a symbol rate and p, q, and r are positive integers.

3. The method of claim 1, wherein:
the symbol timing for the current symbol is deemed on-time if:

$|(C-A)*(\text{sign of } B)| < \Delta$;

the symbol timing for the current symbol is deemed early if:

$(C-A)*(\text{sign of }B) > \Delta$; and the symbol timing for the current symbol is deemed late if:

$(C-A)*(\text{sign of }B) < -\Delta$;

wherein, $\Delta$ is an predetermined threshold and wherein B=an amplitude of the current symbol, A=an amplitude of a previous input sample, and C=an amplitude of a future input sample.

4. The method of claim 3, wherein the first interval is equal to m number of samples in the sequence of samples, the second interval is equal to (m−1) number of samples in the sequence of samples, and the third interval is equal to (m+1) number of samples in the sequence of samples.

5. The method of claim 3, wherein the predetermined threshold comprises a calibrated estimated value associated with a power level of an incoming signal.

6. The method of claim 3, wherein the predetermined threshold comprises an estimated value associated with a direct current level of an absolute value of derivative of an input to a symbol timing recovery block and scaled by a predetermined constant.

7. The method of claim 1, further comprising:
receiving, at a second sample rate, recovered pulse code modulated digital samples from the recovered symbols; and
resampling the recovered pulse code modulated digital samples including:
quantizing a sampling clock associated with a receptor block to a number y selected from a group consisting of N possible instants between two recovered pulse code modulated samples;
calculating an interpolated value at the selected number; and
providing the interpolated value to the receptor block at a sampling clock of the receptor block.

8. A non-transitory machine-readable storage medium embodying a set of instructions that, when executed by a machine, causes the machine to perform a method, comprising:
selecting a current symbol from the sequence of input samples;
comparing a symbol timing estimate associated with a current symbol to a predetermined threshold, wherein the symbol timing estimate comprises:

$(C-A)*(\text{sign of }B)$, wherein B=an amplitude of the current symbol, A=an amplitude of a previous input sample, and C=an amplitude of a future input sample;
selecting a future symbol strobe that is ahead at an interval equivalent to a predetermined interval based on the comparison of the symbol timing estimate to the predetermined threshold, wherein
if the symbol timing for the current symbol is deemed on-time, selecting the future symbol strobe that is ahead at an interval equivalent to a first interval;
if the symbol timing for the current symbol is deemed early, selecting the future symbol strobe that is ahead at an interval equivalent to a second interval;
if the symbol timing for the current symbol is deemed late, selecting the future symbol strobe that is ahead at an interval equivalent to a third interval;
selecting a future symbol from a sequence of samples, corresponding to the future symbol strobe; and
assigning the future symbol to the current symbol, wherein recovered symbol is the current symbol.

9. A system, comprising:
a processor configured to:
select a current symbol from the sequence of input samples;
compare a symbol timing estimate associated with a current symbol to a predetermined threshold, wherein the symbol timing estimate comprises:

$(C-A)*(\text{sign of }B)$, wherein B=an amplitude of the current symbol, A=an amplitude of a previous input sample, and C=an amplitude of a future input sample;
select a future symbol strobe that is ahead at an interval equivalent to a predetermined interval based on the comparison of the symbol timing estimate to the predetermined threshold, wherein
if the symbol timing for the current symbol is deemed on-time, selecting the future symbol strobe that is ahead at an interval equivalent to a first interval;
if the symbol timing for the current symbol is deemed early, selecting the future symbol strobe that is ahead at an interval equivalent to a second interval;
if the symbol timing for the current symbol is deemed late, selecting the future symbol strobe that is ahead at an interval equivalent to a third interval;
select a future symbol from a sequence of samples, corresponding to the future symbol strobe; and
assign the future symbol to the current symbol, wherein recovered symbol is the current symbol.

10. The system of claim 9, wherein the first interval comprises m number of samples in the sequence of samples, wherein: m=p+floor(s), wherein: s=Σq/r−with the condition that the sum (s) is subtracted by 1, whenever it exceeds 1, and wherein p+q/r is a ratio of a sampling clock frequency to a symbol rate, and p, q, and r are positive integers.

11. The system of claim 9, wherein tie a product calculation module comprises a determination module to determine:
the symbol timing for the current symbol is deemed on-time if:

$|(C-A)*(\text{sign of }B)| < \Delta$;

the symbol timing for the current symbol is deemed early if:

$(C-A)*(\text{sign of }B) > \Delta$; and the symbol timing for the current symbol is deemed late if:

$(C-A)*(\text{sign of }B) < -\Delta$;

wherein $\Delta$ is the predetermined threshold and B=an amplitude of the current symbol, A=an amplitude of a previous input sample, and C=an amplitude of a future input sample.

12. The system of claim 11, wherein the first interval is equal to m number of samples in the sequence of samples, the second interval is equal to (m−1) number of samples in the sequence of samples, and the third interval is equal to (m+1) number of samples in the sequence of samples.

13. The system of claim 11, wherein the predetermined threshold comprises a calibrated estimated value associated with a power level of an incoming signal.

14. The system of claim 11, wherein the predetermined threshold comprises an estimated value associated with a direct current level of an absolute value of derivative of the input to a symbol timing recovery block and scaled by a predetermined constant.

15. The system of claim 11, wherein the processor is further configured to:
obtain, at a second sample rate, recovered Pulse Code Modulated digital samples from the recovered symbols;
resample the recovered Pulse Code Modulated digital samples, by:
quantize a sampling clock associated with a receptor block to a number y selected from a group consisting of N possible instants between two recovered samples;
calculate an interpolated value at the selected number; and
provide the interpolated value to the receptor block at a sampling clock of the receptor block.

16. The apparatus of claim 11, wherein the predetermined threshold comprises an estimated value associated with a direct current level of an absolute value of derivative of an input to a symbol timing recovery block and scaled by a predetermined constant.

17. An apparatus, comprising:
a symbol timing recovery block to perform symbol timing recovery;
a symbol sampler and angle finder to perform symbol recovery and determine a differential angle between successive symbols;
a demapper to map the differential angle to an associated group of bits signified by the differential angle;
a pulse code modulation (PCM) sample extraction module to arrange decoded bits into PCM samples of bandlimited signal;
a PCM sample clock derived from a symbol clock of the symbol timing recovery block to generate PCM sample timing; and
a sample rate converter to change a sampling rate from a first sampling rate to a clock domain of a receptor block.

18. The apparatus of claim 17, further comprising:
an analog to digital converter to convert an analog input signal to digital samples at a sampling clock;
an automatic gain control block to ensure that input signal power is seen by a receiver as constant;
an IQ mixer to mix the input signal to baseband into an In-Phase component and a Quadrature component;
a downsampler to decrease a sample rate of the digital samples;
a matched filtering component to perform matched filtering of the digital samples for noise rejection and optimum detection;
an interpolation component in increase the sample rate to enhance detection of symbols; and
a parallel to serial conversion module to serialize the symbol to bits.

19. A method for recovering a symbol clock, comprising:
converting an input wireless analog signal into a sequence of samples according to a sampling clock;
selecting a first sample from the sequence of samples to represent a current symbol;
calculating a symbol timing estimate of the current symbol based on magnitudes of the first sample, a second sample immediately prior to the first sample and a third sample immediately following the first sample;
comparing the symbol timing estimate of the current symbol to a predetermined threshold, wherein the predetermined threshold is an estimated value associated with a direct current level of an absolute value of a derivative of an input to a symbol timing recovery block and scaled by a predetermined constant;
estimating timing of a future symbol based on the comparison;
selecting a fourth sample from the sequence of samples based on the timing estimate; and
assigning the fourth sample as the future symbol.

20. The method of claim 19, wherein the current symbol and the future symbol comprise a plurality of samples.

21. A non-transitory machine-readable storage medium embodying a set of instructions that, when executed by a machine, causes the machine to perform a method, comprising:
converting an input analog signal into a sequence of samples according to a sampling clock;
selecting a first sample from the sequence of samples to represent a current symbol;
calculating a symbol timing estimate of the current symbol based on magnitudes of the first sample, a second sample immediately prior to the first sample and a third sample immediately following the first sample;
comparing the symbol timing estimate of the current symbol to a predetermined threshold, wherein the predetermined threshold is an estimated value associated with a direct current level of an absolute value of a derivative of an input to a symbol timing recovery block and scaled by a predetermined constant;
estimating timing of a future symbol based on the comparison;
selecting a fourth sample from the sequence of samples based on the timing estimate; and
assigning the fourth sample as the future symbol.

22. A system, comprising:
a processor configured to:
convert an input analog signal into a sequence of samples according to a sampling clock;
select a first sample from the sequence of samples to represent a current symbol;
calculate a symbol timing estimate of the current symbol based on magnitudes of the first sample, a second sample immediately prior to the first sample and a third sample immediately following the first sample;
compare the symbol timing estimate of the current symbol to a predetermined threshold, wherein the predetermined threshold is an estimated value associated with a direct current level of an absolute value of a derivative of an input to a symbol timing recovery block and scaled by a predetermined constant;
estimate timing of a future symbol based on the comparison;
select a fourth sample from the sequence of samples based on the timing estimate; and
assign the fourth sample as the future symbol.

* * * * *